(12) United States Patent
Hiruma et al.

(10) Patent No.: US 6,367,525 B1
(45) Date of Patent: Apr. 9, 2002

(54) PNEUMATIC TIRE AND METHOD OF MAKING TIRE

(75) Inventors: Masato Hiruma; Gen Suzuki; Akio Kusano; Hiroshi Mouri, all of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/129,037

(22) Filed: Aug. 4, 1998

(30) Foreign Application Priority Data

| Aug. 4, 1997 | (JP) | 9-209311 |
| Aug. 7, 1997 | (JP) | 9-212956 |
| Dec. 25, 1997 | (JP) | 9-358190 |
| Jun. 8, 1998 | (JP) | 10-159734 |

(51) Int. Cl.$^7$ ............ B29D 30/52; B60C 1/00; B60C 19/08; B60C 11/00
(52) U.S. Cl. ............... 152/152.1; 152/209.5; 152/DIG. 2; 156/123; 156/128.6
(58) Field of Search ............ 152/152.1, 209.5, 152/DIG. 2; 156/123, 128.1, 128.6, 129, 125, 127

(56) References Cited

U.S. PATENT DOCUMENTS

| 2,339,546 A | * | 1/1944 | Hanson | 152/DIG. 2 |
| 5,518,055 A | | 5/1996 | Teeple et al. | |
| 5,718,781 A | * | 2/1998 | Verthe et al. | 152/152.1 |
| 5,872,178 A | * | 2/1999 | Kansupada et al. | 152/152.1 |
| 5,898,047 A | * | 4/1999 | Howald et al. | 152/152.1 |
| 5,937,926 A | * | 8/1999 | Powell | 152/209.5 |
| 5,942,069 A | * | 8/1999 | Gerresheim et al. | 152/152.1 |
| 6,044,882 A | * | 4/2000 | Crawford et al. | 152/DIG. 2 |
| 6,070,630 A | * | 6/2000 | Pompei et al. | 152/DIG. 2 |

FOREIGN PATENT DOCUMENTS

| CH | 597008 | * | 3/1978 | 152/DIG. 2 |
| DE | 25 32 263 | | 1/1976 | |
| EP | 0 658 452 A1 | | 6/1995 | |
| EP | 0 681 931 A1 | | 11/1995 | |
| EP | 0 705 722 A1 | | 4/1996 | |
| EP | 0 718 126 A2 | | 6/1996 | |
| EP | 0 718 127 A1 | | 6/1996 | |
| EP | 732229 | * | 9/1996 | 152/DIG. 2 |
| EP | 0 747 243 A1 | | 12/1996 | |
| EP | 0 787 604 A2 | | 8/1997 | |
| EP | 0 847 880 A1 | | 6/1998 | |
| EP | 881060 | * | 12/1998 | |
| EP | 890460 | * | 1/1999 | |
| GB | 544757 | | 2/1941 | |

OTHER PUBLICATIONS

Donnet et al, *Carbon Black*, pp. 19–21, 1976.*
Abstract for German 2532263.*
Abstract for Europe 787604.*

* cited by examiner

*Primary Examiner*—Steven D. Maki
(74) *Attorney, Agent, or Firm*—Sughrue Mion, PLLC

(57) ABSTRACT

A pneumatic tire comprising a tread portion which comprises a surface rubber layer which is disposed in an outer portion of the tread portion in the radial direction of said tire and has a specific resistance of $10^8$ Ω·cm or more after curing by vulcanization and conductive rubber members which comprise a rubber composition having a specific resistance of $10^6$ Ω·cm or less and replace a portion of the surface rubber layer, wherein the conductive rubber members are disposed in portions of the surface rubber layer extending from the outer surface to the inner surface in the radial direction of said tire discontinuously in the circumferential direction of said tire at the outer surface of the surface rubber layer in the radial direction of said tire, is provided. The pneumatic tire shows not only an excellent effect of static discharge but also excellent durability.

17 Claims, 9 Drawing Sheets

PNEUMATIC TIRE AND METHOD OF MAKING TIRE

BACKGROUND OF THE INVENTION

1. Field of the Invention

The present invention relates to an antistatic pneumatic tire showing improved durability.

2. Description of the Related Art

Heretofore, carbon black has generally been used as the reinforcing agent for tires. However, in recent years, improvement in the fuel economy of automobiles has been demanded to deal with environmental problems and much study has centered on how to decrease the rolling resistance of a tire. Therefore, tread rubbers having formulations containing a decreased amount of carbon black which causes hysteresis loss and using silica as a reinforcing material have been developed. Tread rubbers comprising silica as a reinforcing material provide increased braking ability on wet roads (referred to as wet traction, hereinafter) and decreased rolling resistance. However, tread rubbers comprising silica have a problem in that the electric resistance thereof is higher than that of tread rubbers comprising carbon black without silica, and electricity conducted from the body of an automobile and electricity generated by internal friction during deformation of the rubber are accumulated.

To solve the problem of static electricity accumulation, for example, antistatic tires having a surface covered with a layer of a conductive rubber have been proposed in the specifications of European Patent No. 705722 and European Patent No. 718126. However, these tires have a problem in that the electric conductivity decreases when abrasion of the tread rubber takes place in the intermediate to final period of the life span of the tire.

In the specification of European Patent No. 681931, an antistatic pneumatic tire comprising a conductive rubber member disposed in the circumferential direction of the tire has been proposed. In the specifications of the U.S. Pat. No. 5,518,055 and European Patent No. 658,452, antistatic tires comprising two conductive rubber member disposed between the tread portion and the sides of the tires have been proposed. However, these tires have a problem in that the tires are weak against a force applied from a transverse direction because these tires have a structure shown in FIG. 6 in which conductive rubber members 20 having the same thickness as that of tread rubbers 10 are disposed between the tread portions 10. Separation tends to takes place at the boundaries of the conductive rubber members 20 and the tread portions 10 as shown in FIG. 7. When separation takes place at a portion of the tire, the separation extends in the circumferential direction over the whole tire, and the durability of the tire markedly decreases.

SUMMARY OF THE INVENTION

The present invention has been made in accordance with the above facts and has an object of providing a pneumatic tire showing not only excellent static discharge effects but also excellent durability.

The present inventors paid attention to the arrangement of conductive rubber members, and it was found as the result of extensive studies that the above object can be achieved by the means explained below. The present invention has been made on the basis of this knowledge.

The pneumatic tire of the present invention is described.

The pneumatic tire of the present invention comprises a tread portion which comprises a surface rubber layer which is disposed in an outer portion of the tread portion in the radial direction of said tire and has a specific resistance of $10^8$ Ω·cm or more after curing by vulcanization, and conductive rubber members which comprise a rubber composition having a specific resistance of $10^6$ Ω·cm or less and with which portions of the surface rubber layer are replaced, wherein the conductive rubber members are disposed in portions of the surface rubber layer extending from the outer surface to the inner surface in the radial direction of said tire discontinuously in the circumferential direction of said tire at the outer surface of the surface rubber layer in the radial direction of said tire.

The pneumatic tire of the first embodiment of the present invention comprises a tread portion which comprises a surface rubber layer which is disposed in an outer portion of the tread portion in the radial direction of said tire and has a specific resistance of $10^8$ Ω·cm or more after curing by vulcanization, and conductive rubber members which comprise a rubber composition having a specific resistance of $10^6$ Ω·cm or less and with which portions of the surface rubber layer are replaced, wherein the conductive rubber members are disposed in portions of the surface rubber layer extending from the outer surface to the inner surface in the radial direction of said tire, are discontinuous in the circumferential direction of said tire at the outer surface of the surface rubber layer in the radial direction of said tire, have a width of 0.1 to 3.0 mm, and are disposed in such a manner that at least some of the conductive rubber members are placed inside an area of the surface of said tire which contacts with a road surface.

In this pneumatic tire, it is preferable that the conductive rubber members are disposed at at least three positions which are placed in an area of the surface of said tire in contact with a road surface and are placed in the same cross section in the transverse direction of said tire.

It is preferable that the length of the conductive rubber member in the circumferential direction of said tire is the same as or less than the length of an area of the surface of said tire in contact with a road surface. It is further preferable that the length of the conductive rubber member in the circumferential direction of said tire is $\frac{1}{12}$ or less of the length of the circumference of said tire. It is also preferable that the conductive rubber members have a width of 0.5 to 2.0 mm.

The tread portion may have a structure consisting of at least two layers comprising a surface rubber layer which is disposed in an outer portion of the tread portion in the radial direction of said tire and an inner rubber layer which is disposed at an inner portion of the tread portion in the radial direction of said tire and has a specific resistance of $10^6$ Ω·cm or less after curing by vulcanization.

It is preferable that the conductive rubber members are made from a rubber cement having a specific resistance of $10^6$ Ω·cm or less after curing by vulcanization.

The pneumatic tire of the first embodiment of the present invention is characterized in that, when the conductive paths are formed by disposing conductive rubber members in the tread portion, the conductive rubber members are separated from each other in the circumferential direction with portions of the tread disposed between the conductive rubber members in the circumferential direction, and not in such a manner that a continuous single conductive rubber member is formed around the complete circumference.

Because of the above structure, force in the transverse direction of the tire is effectively dispersed, and movement of the conductive rubber members and deformation of the rubber at the boundaries thereof is suppressed preventing separation of the conductive rubber members. As a result, durability of the tire is improved.

The pneumatic tire of the second embodiment of the present invention comprises a tread portion which comprises a surface rubber layer which is disposed in an outer portion of the tread portion in the radial direction of said tire and has a specific resistance of $10^8$ $\Omega \cdot cm$ or more after curing by vulcanization and conductive rubber members which comprise a rubber composition having a specific resistance of $10^6$ $\Omega \cdot cm$ or less, have the shape of a column having a small diameter, and replace portions of the surface rubber layer, wherein the conductive rubber member having a shape of a column having a small diameter are disposed in portions of the surface rubber layer extending from the outer surface to the inner surface in the radial direction of said tire and are scattered discontinuously on the outer surface of the surface rubber layer in the radial direction of said tire, preferably at locations separated by approximately the same distance.

It is preferable in the pneumatic tire that thirty or more of the conductive rubber members having the shape of a column having a small diameter are disposed in an area of the surface of said tire which contacts the road surface. It is also preferable that the shape of a column having a small diameter is a shape of an approximately round column and has a diameter of 0.1 to 3 mm. It is more preferable that the shape of an approximately round column has a diameter of 0.5 to 2.0 mm.

The tread portion may have a structure consisting of at least two layers comprising a surface rubber layer which is disposed in an outer portion of the tread portion in the radial direction of said tire and an inner rubber layer which is disposed at an inner portion of the tread portion in the radial direction of said tire and has a specific resistance of $10^6$ $\Omega \cdot cm$ or less after curing by vulcanization.

It is preferable that the conductive rubber members are made from a rubber cement having a specific resistance of $10^6$ $\Omega \cdot cm$ or less after vulcanization.

The pneumatic tire of the second embodiment of the present invention is characterized in that, when the conductive paths are formed by disposing conductive rubber members in the tread portion, conductive rubber members having the shape of a column are disposed across the entire circumference of the tire at locations separated from each other by approximately the same distance so that many locations of the conductive rubber members are disposed in the area of the surface of said tire which contacts the road surface.

In the same manner as that of the pneumatic tire of the first embodiment of the present invention, force in the transverse direction of the tire is effectively dispersed, and movement of the conductive rubber members and deformation of the rubber at the boundaries thereof is suppressed preventing separation of the conductive rubber members because of the above structure. As a result, the durability of the tire is improved.

The pneumatic tire of the third embodiment of the present invention comprises a tread portion which comprises a surface rubber layer which is disposed in an outer portion of the tread portion in the radial direction of said tire and has a specific resistance of $10^8$ $\Omega \cdot cm$ or more after curing by vulcanization and conductive rubber members which comprise a rubber composition having a specific resistance of $10^6$ $\Omega \cdot cm$ or less and replace portions of the surface rubber layer, wherein the conductive rubber members are disposed in portions of the surface rubber layer extending from the outer surface to the inner surface in the radial direction of said tire and are discontinuous in the circumferential direction of said tire at the outer surface of the surface rubber layer in the radial direction of said tire and continuous in the circumferential direction of said tire at an inner portion of the tread portion in the radial direction of said tire.

In the present pneumatic tire, it is preferable that the surface area of the conductive rubber members exposed at the outer surface of the tread portion is 1 to 50% of the surface area of the conductive rubber members if the conductive rubber members were extended continuously in the circumferential direction of said tire at the outer surface of the tread portion in the radial direction of said tire.

The pneumatic tire of the third embodiment of the present invention is characterized in that, as described above, the conductive rubber members comprising a rubber composition having a specific resistance of $10^6$ $\Omega \cdot cm$ or less are discontinuous in the circumferential direction of said tire at the outer surface of the tread portion in the radial direction of said tire and are continuous in the circumferential direction of said tire at an inner portion of the tread portion in the radial direction of said tire.

Because the conductive rubber members comprising a rubber composition having a specific resistance of $10^6$ $\Omega \cdot cm$ or less are discontinuous in the circumferential direction of the pneumatic tire at the outer surface of the tread portion in the radial direction of the tire, static electricity accumulation can be prevented, and even if separation occurs at a portion of the boundary between the conductive rubber members and the tread, spread of the separation along the circumference of the tire can be avoided thereby preventing a decrease in the durability of the tire. Moreover, because the conductive rubber members are continuously disposed in the circumferential direction of the tire at an inner portion of the tread in the radial direction of the tire, discharge of the electricity accumulated in the inner part of the tire can be facilitated. Because of these characteristics, the pneumatic tire of the present invention which shows not only the excellent effect of discharging electricity but also excellent durability has been obtained.

The pneumatic tire of the present invention shows an excellent ability to discharge electricity and does not allow static electricity to accumulate during the entire period of the life span of tire use because of the structures described above. Therefore, the generation of sparks can be prevented, and noise in automobile radios can be decreased. Moreover, separation of the tread portion and the conductive rubber members can be prevented by the effective dispersion of the force applied to the tire in the transverse direction, and the durability of the tire is remarkably improved.

The present invention includes a method of manufacturing a vulcanized tire having a tread portion and a layer radially beneath the tread portion wherein the tread includes a surface rubber layer, wherein the improvement comprises: forming cavities in the tread portion such that the cavities are provided discontinuously along the tire circumferential direction, wherein each cavity extends from a tire radial direction outer side surface of the tread portion to a tire radial direction inner surface of the tread portion; pouring and filling, into the cavities, a rubber cement; and vulcanizing the tread portion such that the rubber cement forms a plurality of conductive rubber members which are electrically connected to the layer beneath the tread portion, wherein the vulcanized surface rubber layer has a specific resistance of $10^8 \Omega \cdot cm$ or more and the vulcanized conductive rubber members have a specific resistance of $10^6 \Omega \cdot cm$ or less.

DETAILED DESCRIPTION OF THE INVENTION

Conductive Rubber Composition

Figure 1:
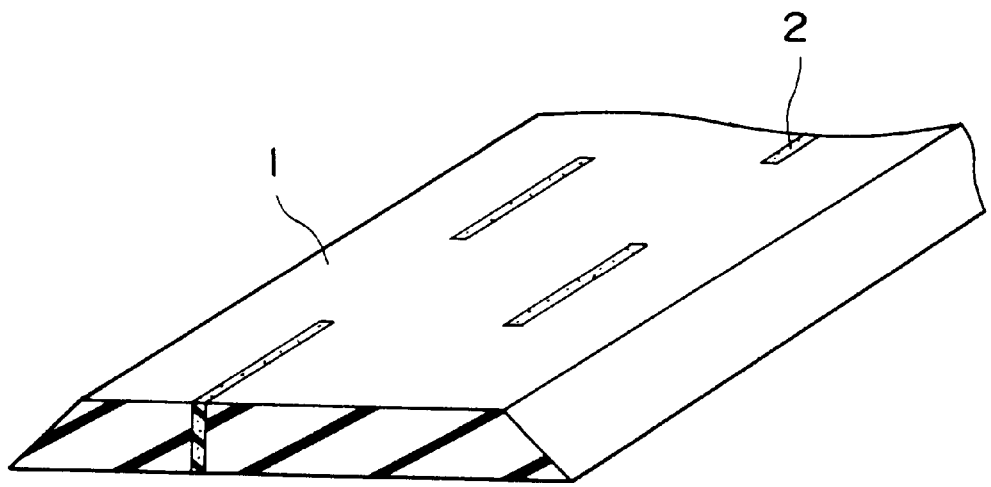
FIG. 1 shows a perspective sectional view exhibiting an example of the preferred embodiments of the pneumatic tire of the present invention.

The rubber composition used for the conductive rubber members of the present invention comprises a rubber composition having a specific resistance of $10^6$ $\Omega \cdot cm$ or lower. The rubber composition used for the conductive rubber members has a specific resistance which is $\frac{1}{100}$ or less of that of the rubber composition used for the tread portion which has a specific resistance of $10^8$ $\Omega \cdot cm$ or more. The smaller the specific resistance, the better. A specific resistance of $10^3$ $\Omega \cdot cm$ or less is more preferable to obtain a remarkable antistatic effect.

It is preferable from the standpoint of durability that diene rubber used in the rubber composition for the conductive rubber members having a specific resistance of $10^6$ $\Omega \cdot cm$ or lower in the present invention comprises at least one rubber selected from styrene-butadiene rubber (SBR), butadiene rubber (BR), and natural rubber (NR).

It is preferable that the rubber composition for the conductive rubber members comprises carbon black having a specific surface area measured by nitrogen adsorption ($N_2SA$) of 80 $m^2/g$ or more, more preferably 130 $m^2/g$ or more, and an absorption of dibutyl phthalate (DBP) of 100 ml/100 g or more, more preferably 110 ml/100 g or more. In this rubber composition, the durability of the rubber layer which forms the charge-carrying paths can be improved and the antistatic effect can be maintained until the final stages of the life span of the tire by using carbon black having a small particle diameter and a high structure as described above. $N_2SA$ and DBP are measured in accordance with the methods of ASTM D3037-89 and ASTM D24-9014, respectively.

When the amount of carbon black used is less than 40 parts by weight per 100 parts by weight of the diene rubber, then the reinforcing properties of the carbon black are insufficient. When the amount exceeds 100 parts by weight, then the rubber becomes too hard after vulcanization and cracks appear if not enough softener is used, and, if too much softener is used, the abrasion resistance is reduced.

As the components for compounding other than carbon black, ingredients generally used in rubber products, such as vulcanizing agents, vulcanization accelerators, auxiliary vulcanization accelerators, softeners, and antioxidants, can be used in amounts generally used in rubber products.

In the present invention, it is preferable that the above conductive rubber members are made from a rubber cement having a specific resistance of $10^6$ $\Omega \cdot cm$ or less after vulcanization. Water may be used as the solvent for the rubber cement, but it is preferable from the standpoint of stability of quality that an organic solvent is mainly used as the solvent for the rubber cement. Examples of the organic solvent include hexane, petroleum ether, heptane, tetrahydrofuran (THF), and cyclohexane. Hexane is preferable among these solvents. The rubber cement is poured into cuts formed discontinuously on the circumference of the surface rubber layer to fill the cuts with the cement. The cuts are formed by a cutting means, such as a cutter. The rubber cement has an advantage in that the cuts can be filled easily.

Tread Rubber Compositions

The rubber composition used for the tread portion of the present invention comprises fillers containing at least silica so that the performance driving on wet roads and the ability to maximize fuel economy are both satisfied at high levels, and the specific resistance of the rubber composition becomes $10^8$ $\Omega \cdot cm$ or more as the result of such adjustment in the formulation.

As the rubber component used in the rubber composition of the tread portion of the present invention, synthetic rubbers or natural rubber can be used singly or blended together. Examples of the synthetic rubber include polyisoprene rubber (IR), polybutadiene rubber BER), styrene-butadiene rubber (SBR), butyl rubber, and halogenated butyl rubber. Among these rubbers, SBR, such as SBR obtained by emulsion polymerization and SBR obtained by solution polymerization, is preferably used, and oil extended SBR is more preferably used.

The filler used in the present invention comprises carbon black and silica.

As carbon black, carbon black having a specific surface area measured by nitrogen adsorption ($N_2SA$) of 80 $m^2/g$ or more and an absorption of dibutyl phthalate (DBP) of 100 $cm^3/100$ g or more can be used. However, the carbon black is not particularly limited.

As silica, synthetic silica prepared by the precipitation process is preferably used. Specific examples of such silica include "NIPSIL AQ" manufactured by NIPPON SILICA KOGYO Co., Ltd.; "ULTRASIL VN3" and "BV3370GR" manufactured by German company DEGUSSA AG., "RP1165MP", "ZEOSIL 165GR", and "ZEOSIL 175VP" manufactured by Rhone Poulenc Company, and "HISIL 233", "HISIL 210", and "HISIL 255" manufactured by PPG company. However, the silica is not limited to these examples.

In the present invention, the rubber composition for the tread portion of the present invention preferably comprises a silane coupling agent. Because the physical bond between silica and rubber is weaker than the bond between carbon black and rubber, abrasion resistance of the tire decreases. The silane coupling agent is used for increasing the strength of the bond between silica and the rubber component to more surely obtain good abrasion resistance.

Examples of the silane coupling agent include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropyl methacrylate monosulfide, and 3-trimethoxysilylpropyl methacrylate monosulfide. Among these silane coupling agents, bis(3-triethoxysilylpropyl) tetrasulfide and 3-trimethoxysilylpropylbenzothiazole tetrasulfide are preferable.

Examples of the silane coupling agent also include bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, and dimethoxymethylsilylpropylbenzothiazole tetrasulfide.

The amount of the silane coupling agent is preferably 5 to 20% by weight, more preferably 10 to 15% by weight, of the amount of silica.

The amount of the filler is 30 to 100 parts by weight, more preferably 50 to 90 parts by weight, per 100 parts by weight of the rubber component. The amount of carbon black, among the fillers, is 0 to 40 parts by weight, more preferably 5 to 20 parts, by weight, per 100 parts by weight of the rubber component. The amount of silica, among the fillers, is 30 to 100 parts by weight, more preferably 50 to 80 parts by weight, per 100 parts by weight of the rubber component. When the amount of silica is less than 30 parts by weight, the friction force on wet roads is insufficient. When the amount of silica exceeds 100 parts by weight, abrasion resistance becomes insufficient, and moreover, processing becomes difficult.

The rubber composition for the tread portion of the present invention may suitably comprise other compounding ingredients generally used in the rubber industry, such as zinc oxide, stearic acid, antioxidants, wax, and vulcanizing agents, within the range that the advantages of the present invention are not adversely affected.

The rubber composition for the tread portion of the present invention can be obtained by mixing the components by using a mixer, such as rolls, an internal mixer, and a Banbury mixer, vulcanized after forming, and used for the tread portion.

Structure of the Tire

The structure of the pneumatic tire of the present invention is specifically described in the following.

FIG. 1 shows a perspective sectional view exhibiting an example of the preferred embodiments of the pneumatic tire of the present invention. As shown in FIG. 1, in this embodiment of the pneumatic tire, conductive rubber members 2 which are elongated in the circumferential direction are disposed in the tread portion 1, which has a specific resistance of $10^8$ Ω·cm or more, at at least one location in the transverse direction, extending substantially through the thickness of the tire, and the tread portion 1 is divided in the transverse direction by the conductive rubber member 2. In the present invention, it is important that the conductive rubber members 2 have a width of 0.1 to 3.0 mm, preferably 0.5 to 2.0 mm, and are disposed in such a manner that the conductive rubber members extend discontinuously along the circumference of the tire, and at least some of the conductive rubber members 2 are placed in the area of the surface of the tire which is in contact with the road surface. In the preferred embodiment shown in FIG. 1, conductive rubber members are disposed at both sides of the center of the tire in a similar manner at the same distance from the center.

When the width of the conductive rubber member 2 is less than 0.1 mm, there is the possibility of the conductive rubber layer being covered over by the tread rubber during vulcanization leading to sufficient conductivity unable to be obtained. When the width exceeds 3.0 mm, the rolling resistance performance of the tire deteriorates, and the formation of uneven wear is accelerated. Because the conductive rubber members 2 extend discontinuously along the circumference of the tire, the force applied to the tire in the transverse direction is effectively dispersed, and movement of the conductive rubber members 2 and deformation of the rubber at the boundaries of the conductive rubber members 2 and the tread portion 1 is suppressed thereby preventing separation of the conductive rubber members 2. Moreover, because at least some of the conductive rubber members 2 are placed in the area of the surface of the tire which is in contact with the surface of the road, the antistatic effect can always be obtained.

The phrase area of the surface of the tire which is in contact with the surface of the road described above is the area of the surface of the tire which is in contact with the surface of the road when the tire is attached to a specific rim, inflated to a specific air pressure, placed perpendicular to a flat plate without rotation, and has a specific mass applied thereto. The specific values in the above description are as follows: in accordance with the specification of Japanese Automobile Tire Manufacturers Association (JATMA) described in JATMA YEAR BOOK, 1996, a tire is attached to a standard rim, and the maximum applicable load and the air pressure corresponding to this load (the maximum air pressure) for the size and ply rating of the tire are applied. When the specification of TRA or the specification of ETRTO is applied at the location of use or manufacture, the specific values in accordance with the applied specification are used as the above specific values.

Figure 2:
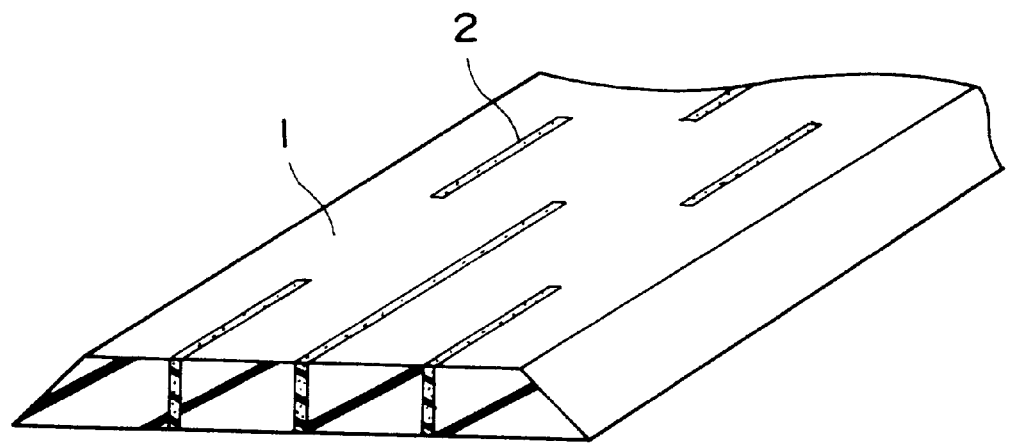
FIG. 2 shows a perspective sectional view exhibiting another example of the preferred embodiments of the pneumatic tire of the present invention.
Figure 3:
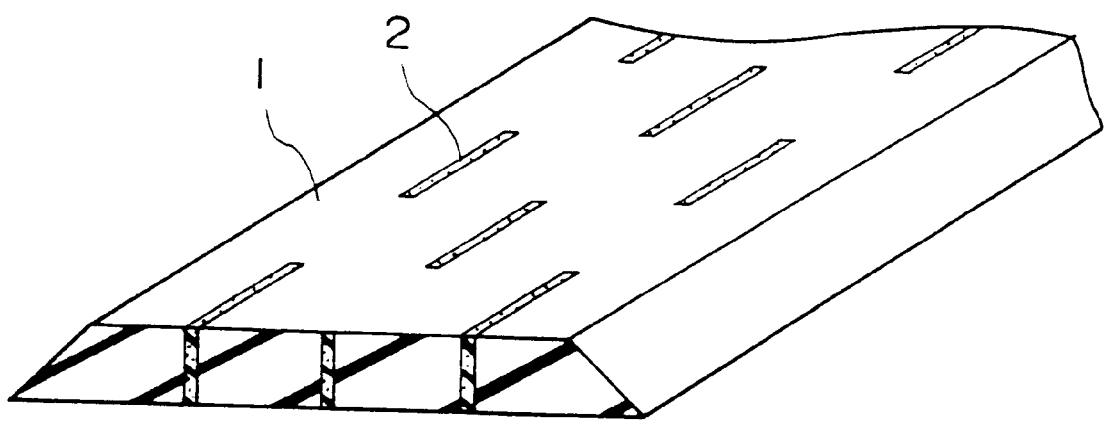
FIG. 3 shows a perspective sectional view exhibiting a further example of the preferred embodiments of the pneumatic tire of the present invention.

In this embodiment, the antistatic effect can be more surely exhibited when the conductive rubber members dividing the tread portion which has a specific resistance of $10^8$ $\Omega \cdot cm$, in the transverse direction are placed at at least three positions in the area of the surface of the tire which is in contact with the road surface and in the same section of the tread portion in the transverse direction of the tire as shown in FIGS. 2 and 3. The force applied to the tire in the transverse direction can be more effectively dispersed, and separation of the conductive rubber members from the tread portion can be more effectively prevented when the length of the conductive rubber members in the circumferential direction is the same as or less than the length of the area of the surface of the tire which is in contact with the road surface, particularly when the length of the conductive rubber members in the circumferential direction is $\frac{1}{12}$ or less of the circumferential length of the tire. The phrase length of the area of the tire which is in contact with the surface of the road described above is the maximum diametrical length in the direction perpendicular to the direction of the axis in the area of the tire which is in contact with the surface of the road when the tire is attached to a specific rim, inflated to a specific air pressure, placed perpendicular to a flat plate without rotation, and loaded with a specific mass. The specific values in the above descriptions are the values in accordance with the specification of JATMA as described above when the specification of JATMA is applied. When the specification of TRA or the specification of ETRTO is applied at the location of use or manufacture, the specific values in accordance with the applied specification are used as the above specific values.

Figure 4A:
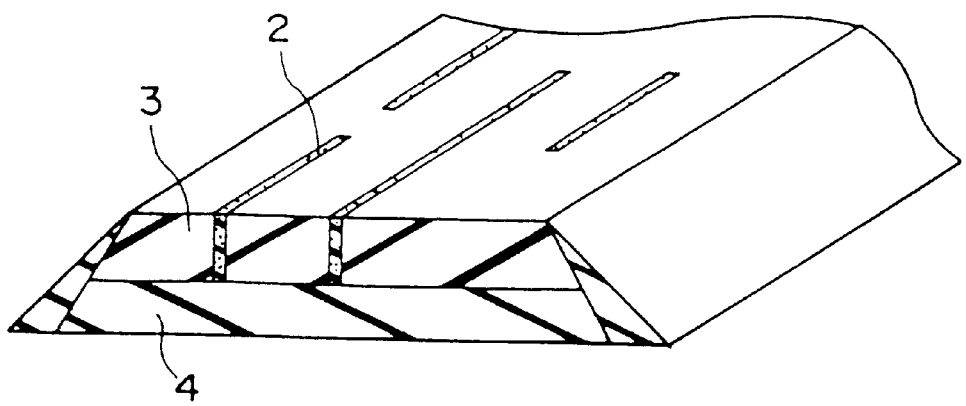
FIG. 4A shows a perspective sectional view exhibiting another example of the preferred embodiments of the pneumatic tire of the present invention, in which conductive rubber members are disposed through the entire thickness of a surface rubber layer.
Figure 4B:
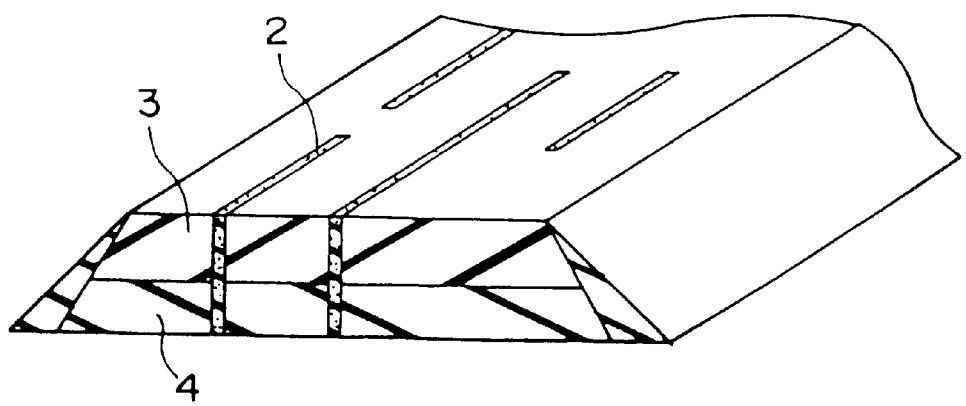
FIG. 4B shows a perspective sectional view exhibiting another example of the preferred embodiments of the pneumatic tire of the present invention, in which conductive rubber members are disposed through the entire thickness of a surface rubber layer and an inner layer.
Figure 4C:
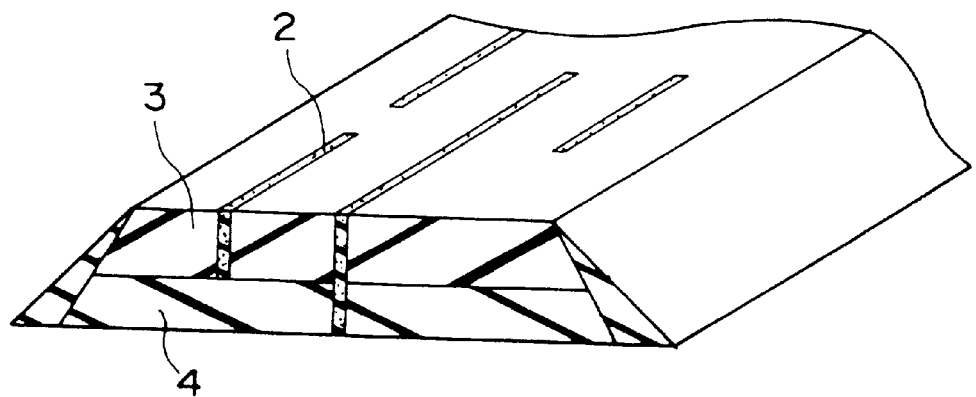
FIG. 4C shows a perspective sectional view exhibiting another example of the preferred embodiments of the pneumatic tire of the present invention, in which a portion of the conductive rubber member are disposed through the entire thickness of a surface rubber layer and an inner layer.

In the present invention, as shown in FIG. 4A, the tread portion may have a structure consisting of at least two layers comprising a surface rubber layer 3 which is disposed in an outer portion in the radial direction of the tire and has a specific resistance of $10^8$ $\Omega \cdot cm$ or more and an inner rubber layer 4 which is disposed in an inner portion in the radial direction of the tire and has a specific resistance of $10^6$ $\Omega \cdot cm$ or less after curing by vulcanization and has conductive rubber members 2 disposed in portions of the surface rubber layer 3 extending in the circumferential direction of the tire with substantially the same thickness as the surface rubber layer 3. When the inner rubber layer 4 has a relatively large specific resistance in the range of $10^6$ $\Omega \cdot cm$ or less after curing by vulcanization, it is preferable for achieving better conductivity that conductive rubber members 2 are disposed in portions extending in the circumferential direction of the tire through the surface rubber layer 3 and the inner rubber layer 4 with substantially the same thickness as the total thickness of these layers as shown in FIG. 4B. The effect of the present invention can be obtained in the same manner as that described above in accordance with this structure. Alternatively, conductive rubber members may be disposed in such a manner that a portion of the conductive rubber members are disposed in portions extending through the surface rubber layer 3 and the inner rubber layer 4 with substantially the same thickness as the total thickness of these layers as shown in FIG. 4C.

Figure 10:
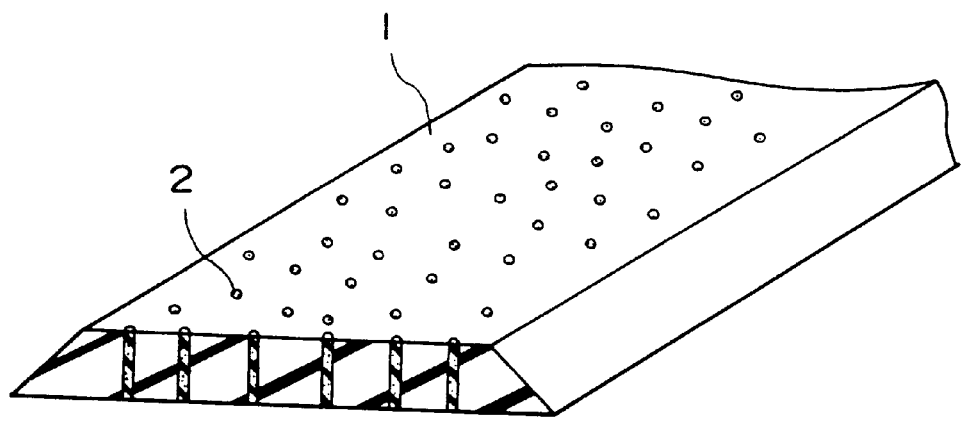
FIG. 10 shows a perspective sectional view exhibiting another example of the preferred embodiments of the pneumatic tire of the present invention.

FIG. 10 shows a perspective sectional view exhibiting another example of the preferred embodiments of the pneumatic tire of the present invention. As shown in FIG. 10, in the pneumatic tire of this embodiment, the surface rubber layer of the tread portion 1 which has a specific resistance of $10^8$ $\Omega \cdot cm$ or more has conductive rubber members 2 having a specific resistance of $10^6$ $\Omega \cdot cm$ or less and the shape of a column having a small diameter, which are disposed in portions of the surface rubber layer extending from the surface substantially through the entire thickness of the layer and distributed along the entire circumference of the tire at positions separated by approximately the same distance from each other in such a manner that 30 or more of the conductive rubber members are disposed in the area of the surface of the tire which is in contact with the road surface. The shape of the column having a small diameter is an approximately round columnar shape, and the diameter is preferably 0.1 to 3 mm, more preferably 0.5 to 2.0 mm. When the diameter of the approximately round columnar shape of the conductive rubber member is 0.1 mm or more, insufficient filling does not occur when the specific portions are filled with a cement of the conductive rubber member, and the conductive rubber members can surely be disposed through the entire width of the tread. When the diameter is 3.0 or less, the rolling resistance of the tire does not deteriorate.

In the pneumatic tire shown in FIG. 10, because the conductive rubber members 2 with a shape of a column having a small diameter are distributed along the entire circumference of the tire at positions separated by approximately the same distance from each other in such a manner that 30 or more of the conductive rubber members are disposed in the area of the surface of the tire which is in contact with the road surface, the force applied to the conductive rubber members 2 in the transverse direction is effectively dispersed. Movement of the conductive rubber members 2 and deformation of the rubber at the boundary of the conductive rubber members 2 and the tread portion 1 can be suppressed to prevent separation of the conductive rubber members 2. When the number of the conductive rubber members 2 disposed in the area of the surface of the tire which is in contact with the road surface is less than 30, sufficient conductivity cannot be positively obtained.

Figure 11:
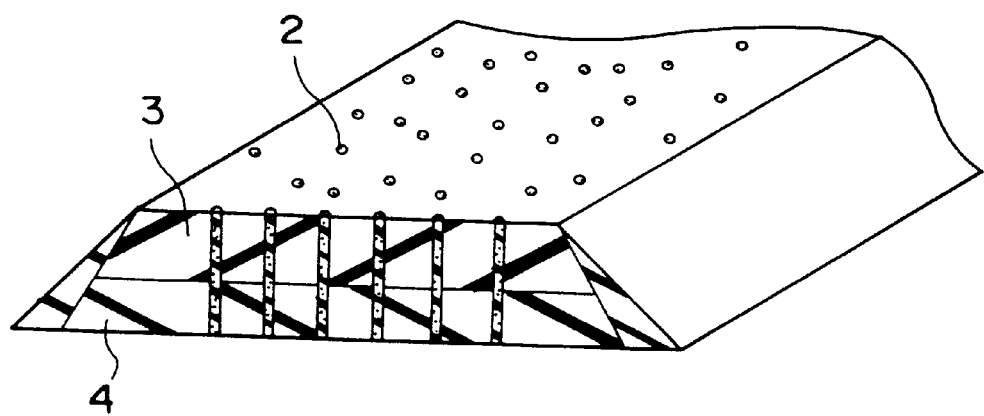
FIG. 11 shows a perspective sectional view exhibiting another example of the preferred embodiments of the pneumatic tire of the present invention.

In the present invention, as shown in FIG. 11, the effect of the present invention can be obtained to the same degree as that described above from a tire which comprises a tread portion having a structure consisting of at least two layers comprising a surface rubber layer 3, which is disposed in an outer portion of the tread portion in the radial direction of the tire and has a specific resistance of $10^8$ $\Omega \cdot cm$ or more, and an inner rubber layer 4, which is disposed in an inner portion of the tread portion in the radial direction of the tire and has a specific resistance of $10^6$ $\Omega \cdot cm$ or less after curing by vulcanization. The conductive rubber members 2 are disposed in portions of the tread portion extending in the circumferential direction of the tire with substantially the same thickness as the total thickness of the outer surface layer 3 and the inner layer 4. Similarly to the example shown in FIG. 4A, the conductive rubber members 2 may extend in the circumferential direction of the tire with substantially the same thickness as the entire thickness of the surface rubber layer 3. Alternatively, similarly to the example shown in FIG. 4C, a portion of the conductive rubber members 2 may extend in the circumferential direction of the tire with substantially the same thickness as the entire thickness of the surface rubber layer 3.

Figure 12A:
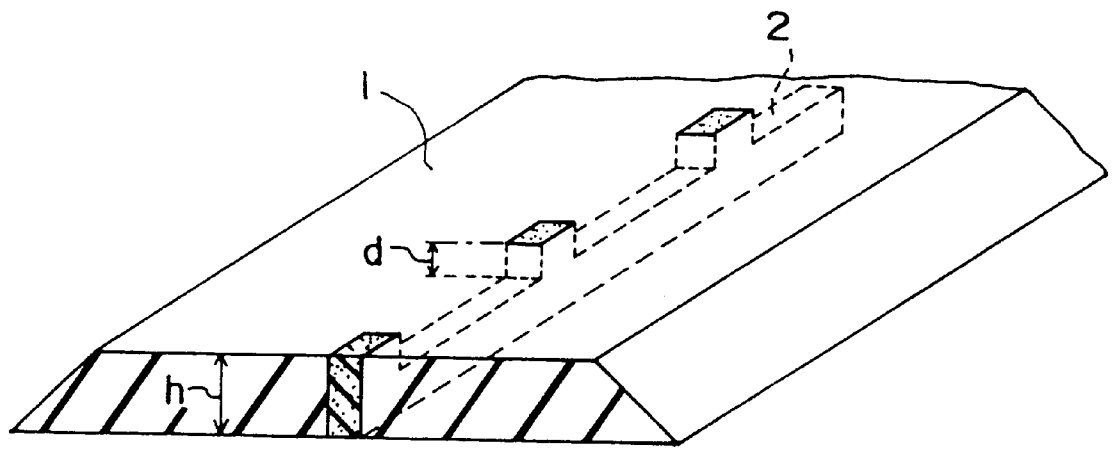
FIG. 12A shows a perspective sectional view exhibiting another example of the preferred embodiments of the pneumatic tire of the present invention.
Figure 12B:
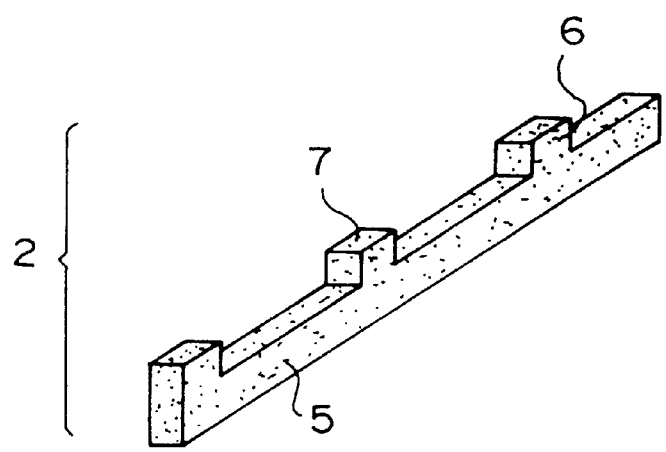
FIG. 12B shows a perspective sectional view of a conductive rubber member in this pneumatic tire.

FIG. 12A shows a perspective sectional view exhibiting another example of the preferred embodiments of the pneumatic tire of the present invention, and FIG. 12B shows a perspective sectional view of a conductive rubber member in this pneumatic tire.

As shown in FIG. 12A, a conductive rubber member 2 having the shape of a comb as shown in FIG. 12B is disposed in inner portions of the tread portion 1 extending along the circumferential direction of the tread portion. The conductive rubber member 2 having the shape of a comb shown in FIG. 12B comprises a base portion 5 extending in the circumferential direction of the tread portion 1 and protrusions 6 protruding from this portion. The top faces 7 of the protrusions 6 are exposed at the surface of the tread portion 1.

In the pneumatic tire shown in FIG. 12, it is important that the conductive rubber member 2 is discontinuous in the circumferential direction of the tire at the outer surface of the surface rubber layer constituting the tread portion in the radial direction of the tire and continuous in the circumferential direction of the tire at an inner portion of the surface rubber layer in the radial direction of the tire, preferably in the vicinity of the surface at an inner portion of the surface layer in the radial direction of the tire.

The relative positions of the protrusions are not particularly limited as long as the protrusions are disposed discontinuously. The protrusions may be distributed unevenly, but it is preferable that the protrusions are disposed at the same distance from each other.

From the standpoint of preventing separation of the tread portion, it is preferable that the exposed surface area of the conductive rubber member (the area of the protruding end faces 7) is 1 to 50% of the what the exposed surface area of the conductive rubber member would be if the conductive rubber member were to be exposed for its entire length in a circumferential direction across the outer surface layer in the radial direction of the tire. When the area of the conductive rubber member exposed at the surface is less than 1%, the antistatic effect is insufficient. When the area exceeds 50%, the resistance to separation is insufficient.

Figure 13:
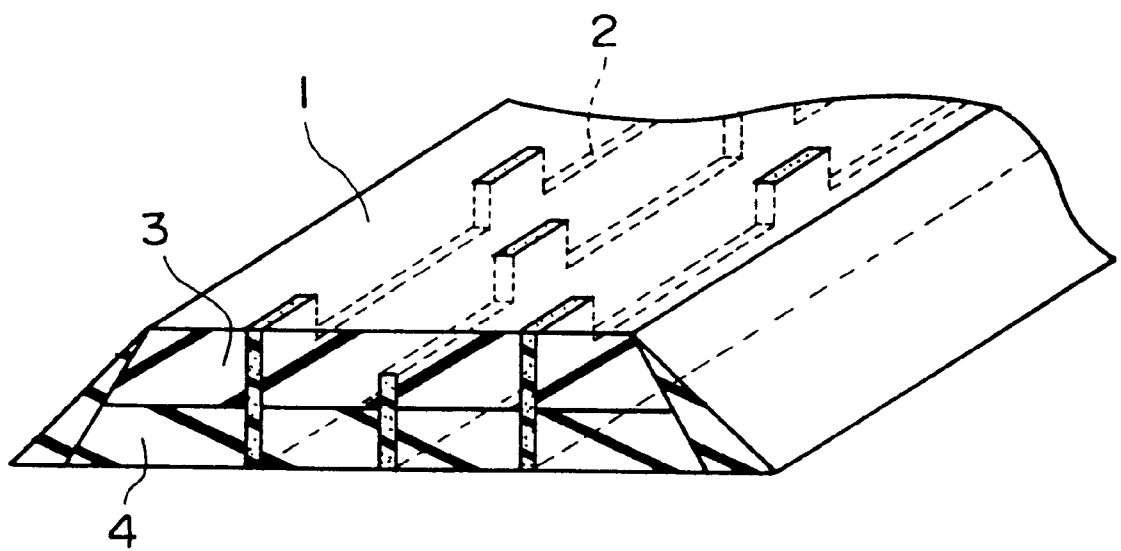
FIG. 13 shows a perspective sectional view exhibiting another example of the preferred embodiments of the pneumatic tire of the present invention.

In the present invention, as shown in FIG. 13, the effect of the present invention can be obtained to the same degree as that described above from a tire which comprises a tread portion having a structure consisting of at least two layers comprising a surface rubber layer 3 which is disposed in an outer portion of the tread portion in the radial direction of the tire and which has a specific resistance of $10^8$ Ω·cm or more and an inner rubber layer 4 which is disposed in an inner portion of the tread portion in the radial direction of the tire and which has a specific resistance of $10^6$ Ω·cm or less after curing by vulcanization, wherein conductive rubber members 2 are disposed in portions of the tread portion extending substantially through the total thickness of the outer surface layer 3 and the inner layer 4. Similarly to the case shown in FIG. 4A, all of the conductive rubber members 2 may extend in the circumferential direction of the tire with substantially the same thickness as the entire thickness of the surface rubber layer 3. Alternatively, similar to the case shown in FIG. 4C, a portion of the conductive rubber members 2 may extend in the circumferential direction of the tire with substantially the same thickness as the entire thickness of the surface rubber layer 3.

EXAMPLES

The present invention is described specifically with reference to examples and comparative examples in the following.

In accordance with the formulations shown in Tables 1 and 2, rubber compositions for the tread portion and the conductive rubber members of a pneumatic tire which comprises a layer radially beneath the tread portion were prepared. The rubber composition used for the conductive rubber member was prepared in the form of a rubber cement.

TABLE 1

Tread Rubber

|  | cap rubber |
| --- | --- |
| styrene-butadiene rubber*[1] | 96 (parts by weight) |
| butadiene rubber*[2] | 30 |
| $SiO_2$.[3] | 60 |
| carbon black (N234)*[4] | 20 |
| silane coupling agent*[5] | 6 |
| ZnO | 3 |
| stearic acid | 2 |
| aromatic oil | 10 |
| vulcanization accelerator (CBS)*[6] | 1.5 |
| vulcanization accelerator (DPG)*[7] | 2 |
| sulfur | 1.5 |

*[1]Manufactured by Japan Synthetic Rubber Co., Ltd.; SBR1712
*[2]Content of the cis-linkage, 96%
*[3]NIPSIL VN3
*[4]$N_2SA$, 126 m$^2$/g; DBP, 125 ml/100 g
*[5]Manufactured by DEGUSSA Company; Si69
*[6]Diphenylguanidine

TABLE 2

Conductive Rubber

|  | rubber composition |
| --- | --- |
| natural rubber | 40 (parts by weight) |
| styrene-butadiene rubber*[8] | 60 |
| carbon black (N134)*[9] | 60 |
| aromatic oil | 15 |
| ZnO | 2 |
| antioxidant*[10] | 1 |
| vulcanization accelerator (DPG) | 0.2 |
| vulcanization accelerator (NS)*[11] | 0.8 |
| sulfur | 1.5 |

*[8]Manufactured by Japan Synthetic Rubber Co., Ltd.; SBR1500
*[9]$N_2SA$, 146 m$^2$/g; DBP, 127 ml/100 g
*[10]N-(1,3-dimethylbutyl)-N'-phenyl-p-phenylenediamine
*[11]N-tert-butyl-2-benzothiazolylsulfenamide The obtained conductive rubber was used for the conductive rubber members 2 disposed in the tread portion 1 in the manner shown in FIGS. 1 to 4 and FIG. 6, and pneumatic tires of size 185/65R14 were prepared.

Example 1

As shown in FIG. 1, two series of conductive rubber members 2 having the same thickness as the tread were disposed at both sides of the center of a tire so that the exposed surface areas of the conductive members 2 on either side of the center of the tire are approximately the same. The conductive rubber members had a width of 1 mm and a length of 150 mm in the circumferential direction of the tire (1/12 of the entire circumference of the tire).

Example 2

As shown in FIG. 2, conductive rubber members 2 having the same thickness as the tread were disposed in three rows along the entire circumference of the tire. One row of the conductive rubber members was placed along a line running along the center of the tread in the circumferential direction of the tire. The remaining two rows of the conductive rubber members were placed on both sides of the central line running parallel with the central line of a tire so that the exposed surface areas of the conductive members 2 on either side of the center of the tire are approximately the same. The conductive rubber members 2 had a width of 1 mm. The conductive rubber members 2 placed along the central line had a length of 150 mm in the circumferential direction of the tire ($1/12$ of the entire circumference of the tire), and the conductive rubber members 2 placed on either side of the central line had a length of 75 mm ($1/24$ of the entire circumference of the tire).

Example 3

As shown in FIG. 3, conductive rubber members were disposed in more scattered positions. Three rows of conductive rubber members 2 with the same thickness as the tread were disposed along the entire circumference of the tire. One row of the conductive rubber members was placed along a line running along the center of the tread in the circumferential direction of the tire. The other two rows of the conductive rubber members divided into smaller portions than those shown in FIG. 1 and 2 were placed on both sides of the central line running parallel with the central line so that the exposed surface areas of the conductive members 2 on either side of the center of the tire are approximately the same. The conductive rubber members 2 had a width of 1 mm. The conductive rubber members 2 placed along the central line had a length of 150 mm ($1/12$ of the entire circumference of the tire), and the conductive rubber members 2 placed on either side of the central row had a length of 75 mm ($1/24$ of the entire circumference of the tire).

Example 4

As shown in FIG. 4c, the tread used had a so-called cap/base structure comprising two layers comprising a surface rubber layer and an inner rubber layer. The row of conductive rubber members 2 disposed along the central line of the tire were disposed in the tread portion as far as the bottom of the base layer. The row of conductive rubber members 2 disposed on either side of the central row were disposed in the portion of the tread as far as the bottom of the cap layer and the top of the base layer.

that a single continuous conductive rubber member 2 having a width of 5 mm was disposed along the central line of the circumference of the tire.

Figure 8:
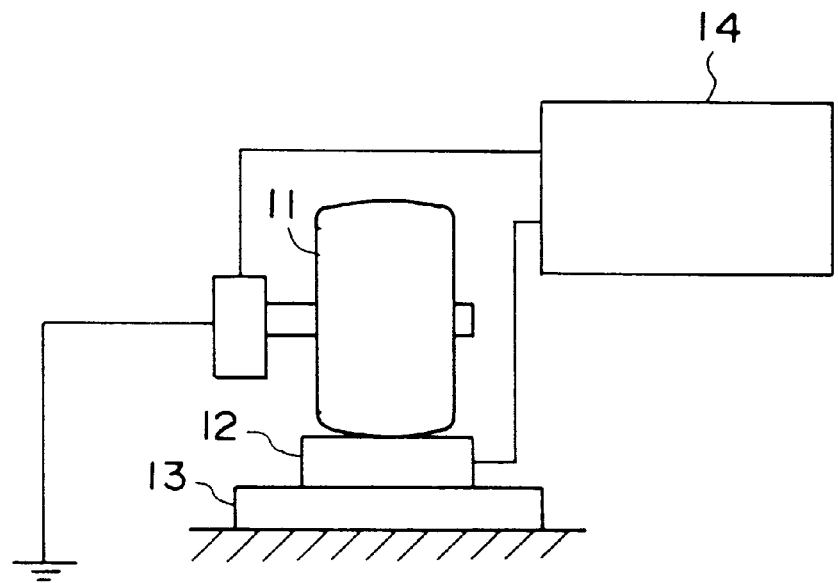
FIG. 8 shows a schematic diagram of an apparatus for the measurement of specific resistance used in the examples.

The electric resistance (the specific resistance) of a tire was obtained as follows:

The specific resistance was measured in accordance with the method of GERMAN RUBBER INDUSTRY ASSOCIATION, 110 Sheet 3 using a high resistance meter, model HP4339A, manufactured by HEWLETT PACKARD Company, as shown in FIG. 8. In FIG. 8, 11 shows a tire, 12 shows a steel plate, 13 shows an insulating plate, and 14 shows the high resistance meter. A voltage of 1,000V was applied between the steel plate 12 placed on the insulation plate 13 and a rim of the tire 11.

The specific resistance of the conductive rubber member 2 was obtained as follows:

A sample having a disk shape was prepared. The specific resistance R of a portion having a radius r=2.5 cm and a thickness t=0.2 cm was measured using a test box for measuring insulation resistance manufactured by ADVANTEST Company shown in FIG. 9.

Figure 9A:
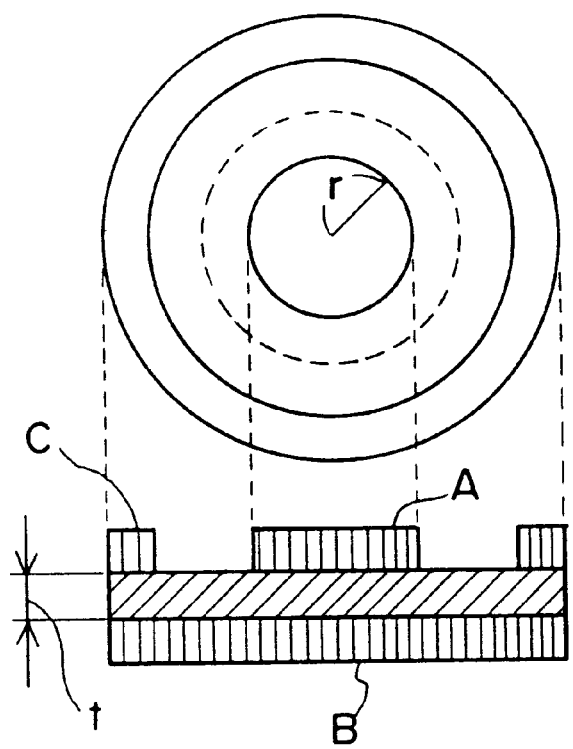
FIG. 9A and 9B show views of an apparatus for the measurement of specific resistance and a diagram exhibiting the method of the measurement.
Figure 9B:
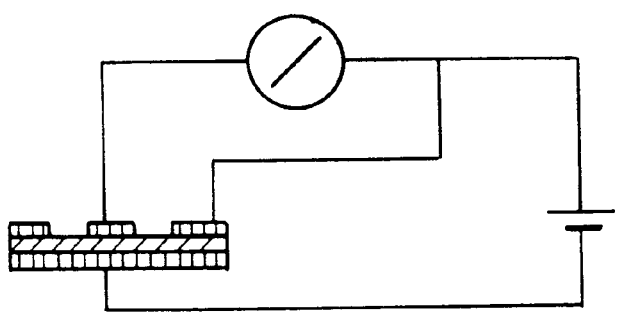

The specific resistance p was calculated in accordance with the following equation:

$$\rho = (a/t)R$$

wherein a represents the sectional area ($=p \times r^2$), and t represents the thickness. In FIG. 9, A shows a main electrode, B shows a counter electrode, C shows a guard electrode, and t shows the thickness of the sample.

In the tire drum test, the speed was gradually increased under a load of 420 kg with the inner pressure of the tire adjusted to 2.0 kg. When separation took place at the boundary of the conductive rubber members and the tread portions, the speed at the time of the separation and the distance before the separation took place were measured. The result obtained with the tire having a conventional structure was used as the reference which was set at 10, and the results of the test were expressed as an index relative to the reference. The larger the number, the better the result. The results obtained are shown together in Table 3.

TABLE 3

Figure 5:
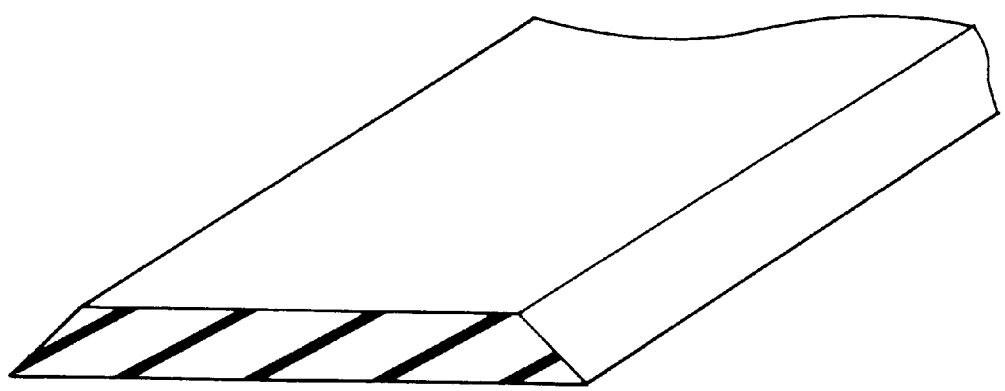
FIG. 5 shows a perspective sectional view schematically exhibiting a tread portion of a conventional pneumatic tire.
Figure 6:
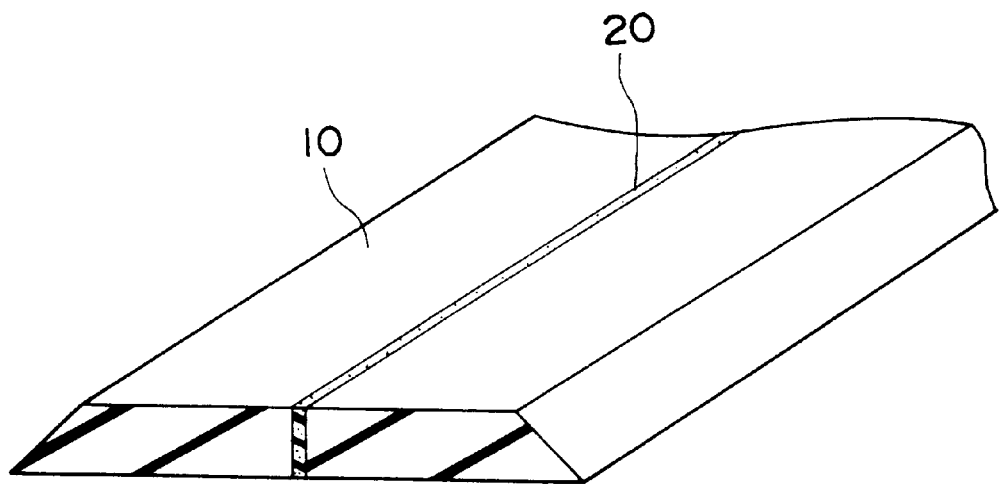
FIG. 6 shows a perspective sectional view schematically exhibiting a tread portion of the pneumatic tire used in the comparative example.
Figure 7:
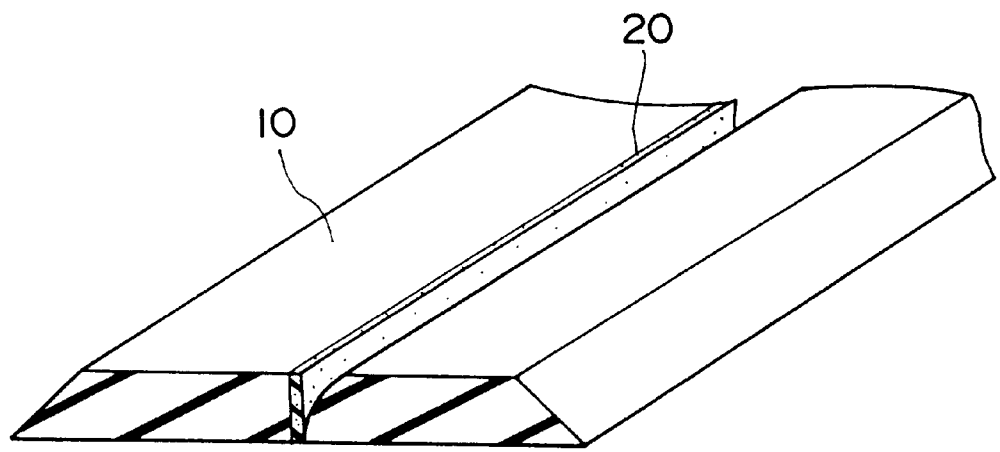
FIG. 7 shows a perspective sectional view schematically exhibiting separation in a tread portion of the pneumatic tire used in the comparative example.

|  | Conventional Structure | Comparative Example 1 | Example 2 | Example 3 | Example 4 |
|---|---|---|---|---|---|
| Conductive rubber member |  |  |  |  |  |
| FIG. No. | FIG. 5 | FIG. 6 | FIG. 1 | FIG. 2 | FIG. 3 | FIG. 4 |
| specific resistance ($\Omega \cdot cm$) | — | $10^6$ | $10^5$ | $10^5$ | $10^5$ | $10^5$ |
| width (mm) | — | 5 | 1 | 1 | 1 | 1 |
| electric resistance ($\Omega$) | $10^{11}$ | $10^6$ | $10^6$ | $10^8$ | $10^6$ | $10^8$ |
| durability (index) | 10 | 5 | 9 | 9.5 | 9.5 | 9.5 |

Example of a Conventional Structure

As shown in FIG. 5, a tire having the same structure as that of the tire prepared in Example 1 was prepared except that the conductive rubber member 2 was not placed therein.

Comparative Example 1

As shown in FIG. 6, a tire having the same structure as that of the tire prepared in Example 1 was prepared except In accordance with the formulations shown in Tables 1 and 2, rubber compositions used for the tread portion and the conductive rubber members of a pneumatic tire were prepared, and the rubber composition for the conductive rubber members was used for conductive rubber members 2 and 20 in the tread portion 1 as shown in FIGS. 10, 11, and 6 to prepare pneumatic tires having a size 185/65R14.

Example 5

As shown in FIG. 10, the surface rubber layer of a tread portion 1 had conductive rubber members 2, which had an approximately round column shape having a diameter of 1 mm, disposed in the portions of the surface rubber layer extending from the surface of the layer substantially through the entire thickness thereof. The conductive rubber members 2 were distributed along the entire circumferential surface of the tire at positions separated by approximately the same distance from each other in such a manner that 40 conductive rubber members are disposed in the area of the surface of the tire which is in contact with the road surface.

Example 6

As shown in FIG. 11, a tread portion having a cap/base structure had conductive rubber members 2, which had an approximately round column shape having a diameter of 1 mm, disposed in the portions of the surface rubber layer extending from the surface of the cap layer substantially through the entire thickness of the tread to the bottom of the base layer. The conductive rubber members were distributed along the entire circumferential surface of the tire at positions separated by approximately the same distance from each other in such a manner that 40 conductive rubber members are disposed in the area of the surface of the tire which is in contact with the road surface.

The electric resistance (the specific resistance) of these tires and the specific resistance of the conductive rubber member 2 were measured in accordance with the above methods. For evaluation of durability, a test tire was attached to an automobile, which was then driven along a circular course with a radius of 80 m under conditions of a side force of 0.4G to 0.5G (1G=9.8 m/s$^2$). Separation of the conductive rubber members at the boundary of the tread rubber was examined after twenty rounds of circular driving. When separation was clearly observed, the durability was rated as poor. When no separation was found, the durability was rated as good. The results obtained are shown together in Table 4.

TABLE 4

| | Conventional structure | Comparative Example 1 | Example 5 | Example 6 |
| --- | --- | --- | --- | --- |
| Conductive rubber member | | | | |
| FIG. No. | FIG. 5 | FIG. 6 | FIG. 10 | FIG. 11 |
| specific resistance (Ω · cm) | — | $10^5$ | $10^5$ | $10^5$ |
| diameter or width (mm) | — | 5 | 1 | 1 |
| number in the area of the surface of tire in contact with the road surface | — | — | 40 | 40 |
| electric resistance (n) | $10^{11}$ | $10^8$ | $10^6$ | $10^8$ |
| durability | good | poor | good | good |

A tread rubber composition and a conductive rubber composition were prepared by mixing components in accordance with the formulations shown in Table 5.

TABLE 5

| | tread portion | conductive rubber member |
| --- | --- | --- |
| Formulation (parts by weight) | | |
| SBR 1712[1] | 68.75 | 68.75 |
| SBR 1721[1] | 68.75 | 68.75 |
| silica[2] | 80 | 0 |
| carbon black[3] | 0 | 75 |
| aromatic oil | 4 | 4 |
| antioxidant[4] | 1 | 1 |
| stearic acid | 1 | 1 |
| coupling agent[5] | 8 | 0 |
| paraffin wax | 2 | 1 |
| zinc oxide | 3 | 3 |
| vulcanization accelerator DPG[6] | 0.5 | 0.5 |
| vulcanization accelerator DM[7] | 1.0 | 1.0 |
| vulcanization accelerator NS[8] | 0.5 | 0.5 |
| sulfur | 1.5 | 1.5 |
| Volume resistivity of rubber (Ω · cm) | $10^{13}$ | $10^5$ |

[1] Trade names; manufactured by Japan Synthetic Rubber Co., Ltd.
[2] NIPSIL AQ; manufactured by NIPPON SILICA INDUSTRIAL Co., Ltd.
[3] N339; N$_2$SA, 92; DBP, 123.
[4] N-(1,3-dimethylbutyl)-N'-phenyl-p-phenylenediamine
[5] Trade name, Si69; manufactured by DEGUSSA Company.
[6] Diphenylguanidine
[7] Dibenzothiazyl disulfide
[8] N-t-butyl-benzothiazolylsulfenamide

Example 7

A tire having a size 185/65R14 which had a tread portion having the structure shown in FIG. 12 was prepared using the obtained tread rubber composition and the conductive rubber composition. The conductive rubber member had a width of 2 mm and an area exposed to the surface of 35%.

Comparative Example 2

A tire having a size 185/65R14 which had no conductive rubber member was prepared by using the obtained tread rubber composition.

Comparative Example 3

A tire having a size 185/65R14 which had a tread portion having the structure shown in FIG. 6 was prepared by using the tread rubber composition and the conductive rubber composition obtained above. The conductive rubber members had a width of 2 mm and an area exposed to the surface of 35%.

The electric resistance of these tires was measured in accordance with the above method. The electric resistances of the original tire before use and the tire after being driven for a distance of 20,000 km were measured. Separation was examined by visual observation. The results are shown in Table 6.

TABLE 6

| | Comparative Example 2 | Comparative Example 3 | Example 7 |
| --- | --- | --- | --- |
| Electric resistance of original tire (Ω · cm) | $2 \times 10^{13}$ | $5 \times 10^5$ | $4 \times 10^6$ |
| Electric resistance after driving for 20,000 km (Ω · cm) | $4 \times 10^{13}$ | $1 \times 10^7$ | $5 \times 10^6$ |
| Separation | none | found | none |

As shown in Table 6, the pneumatic tires of the present invention showed an electric resistance which is half of the corresponding value of a tire having no conductive rubber members in the original condition. No separation was found in the pneumatic tire of the present invention after the running test.

What is claimed is:

1. A vulcanized pneumatic tire comprising; a tread portion including a surface rubber layer, formed from a rubber composition having a specific resistance of $10^8$ $\Omega \cdot$cm or more after curing by vulcanization, said surface rubber layer provided at least at a tire radial direction outer side region of tire tread portion, and portions of the tread portion being replaced by a plurality of conductive rubber members formed from a rubber composition whose specific resistance is $10^6$ $\Omega \cdot$cm or less, a layer radially beneath said tread portion, wherein each of the conductive rubber members is provided from a tire radial direction outer side surface of the tread portion to a tire radial direction inner surface of the tread portion and is electrically connected to said layer beneath the tread portion, and elongated exposed portions of the respective conductive rubber members at the tire radial direction outer side surface of the surface rubber layer are formed such that a longitudinal direction of the elongated exposed portions extends along a tire circumferential direction, and are disposed discontinuously along the tire circumferential direction to form a row, wherein the tread portion has at least a two layer structure comprising the surface rubber layer which is disposed in an outer portion of the tread portion in the radial direction of said tire and an inner rubber layer which is disposed in an inner portion of the tread portion in the radial direction of said tire and has a specific resistance of $10^6$ $\Omega \cdot$cm or less after curing by vulcanization such that the inner rubber layer has a relatively large specific resistance in the range of $10^6$ $\Omega \cdot$cm or less after curing by vulcanization, the conductive rubber members have better conductivity than the inner rubber layer, and each conductive rubber member extends through the surface rubber layer and the inner rubber layer with substantially the same thickness as the total thickness of the surface rubber layer and the inner rubber layer.

2. A vulcanized pneumatic tire according to claim 1, wherein the row of exposed portions is a plurality of rows of exposed portions, and any given line along a transverse direction of the tire intersects at least one exposed portion.

3. A vulcanized pneumatic tire according to claim 1, wherein the conductive rubber members have a width of 0.1 to 3.0 mm and are disposed in such a manner that at least some of the conductive rubber members are placed inside area of the tread portion surface of said tire which is in contact with a road surface.

4. A vulcanized pneumatic tire according to claim 1, wherein the length of the conductive rubber members in the circumferential direction of said tire is the same as or less than the length of an area of the tread portion surface of said tire which is in contact with a road surface.

5. A vulcanized pneumatic tire according to claim 1, wherein a length of the conductive rubber members in the circumferential direction of said tire is $\frac{1}{12}$ or less of the length of the circumference of said tire.

6. A vulcanized pneumatic tire according to claim 1, wherein the rubber composition having a specific resistance of $10^6 \Omega \cdot$cm or less contains carbon black which has a specific surface area measured by nitrogen absorption ($N_2SA$) of 80 $m^2$/g or more and an absorption of dibutyl phthalate (DBP) of 100 ml/100 g or more.

7. A vulcanized pneumatic tire according to claim 1, wherein the conductive rubber members are made from a rubber cement having a specific resistance of $10^6 \Omega \cdot$cm or less after curing by vulcanization.

8. A vulcanized pneumatic tire according to claim 1, wherein the rubber composition having a specific resistance of $10^8 \Omega \cdot$cm or more is compounded with a filler containing silica.

9. A vulcanized pneumatic tire comprising; a tread portion including a surface rubber layer, which has a specific resistance of $10^8 \Omega \cdot$cm or more after curing by vulcanization, said surface rubber layer provided at least at a tire radial direction outer side region of a tire tread portion, and portions of the tread portion being replaced by plural conductive rubber members formed from a rubber composition whose specific resistance is $10^6 \Omega \cdot$cm or less, a layer radially beneath said tread portion, wherein each of the conductive rubber members has the shape of a column having a small diameter, and is provided from a tire radial direction outer side surface of the tread portion to a tire radial direction inner surface of the tread portion, and is electrically connected to said layer which is beneath the tread portion, and exposed portions of the respective conductive rubber members are disposed at separate locations in the tire radial direction outer side surface of the surface rubber layer, wherein the tread portion has at least a two layer structure comprising the surface rubber layer which is disposed in an outer portion of the tread portion in the radial direction of said tire and an inner rubber layer which is disposed in an inner portion of the tread portion in the radial direction of said tire and has a specific resistance of $10^6 \Omega \cdot$cm or less after curing by vulcanization, such that the inner rubber layer has a relatively large specific resistance in the range of $10^6 \Omega \cdot$cm or less after curing by vulcanization, the conductive rubber members have better conductivity than the inner rubber layer, and each conductive rubber member extends through the surface rubber layer and the inner rubber layer with substantially the same thickness as the total thickness of the surface rubber layer and the inner rubber layer.

10. A vulcanized pneumatic tire according to claim 9, wherein 30 or more of the conductive rubber members having the shape of a column having a small diameter are disposed in an area of the surface of said tire which is in contact with a road surface.

11. A vulcanized pneumatic tire according to claim 9, wherein the shape of a column having a small diameter is the shape of an approximately round column and has a diameter of 0.1 to 3 mm.

12. A vulcanized pneumatic tire according to claim 9, wherein the rubber composition having a specific resistance of $10^6 \Omega \cdot$cm or less contains carbon black which has a specific surface area measured by nitrogen absorption ($N_2SA$) of 80 $m^2$/g or more and an absorption of dibutyl phthalate (DBP) of 100 ml/100 g or more.

13. A vulcanized pneumatic tire according to claim 9, wherein the rubber composition for the conductive rubber members are made from a rubber cement having a specific resistance of $10^6 \Omega \cdot$cm or less after curing by vulcanization.

14. A vulcanized pneumatic tire according to claim 9, wherein the rubber composition having a specific resistance of $10^8$ $\Omega \cdot$cm or more is compounded with a filler containing silica.

15. A vulcanized pneumatic tire comprising: a tread portion including surface rubber layer, which has a specific resistance of $10^8 \Omega \cdot cm$ or more after curing by vulcanization, said surface rubber layer provided at least at a tire radial direction outer side region of the tread portion, and at least one portion of the tread portion being replaced by at least one conductive rubber member formed from a rubber composition whose specific resistance is $10^6 \Omega \cdot cm$ or less, a layer radially beneath said tread portion wherein each conductive rubber member is disposed from a tire radial direction outer side surface of the tread portion to a tire radial direction inner surface of the tread portion and is electrically connected to said layer which is beneath the tread portion, and elongated exposed portions of each conductive rubber member at the tire radial direction outer side surface of the surface rubber layer are formed such that a longitudinal direction of the elongated exposed portions extends along a circumferential direction of the tire and are aligned discontinuously along the circumferential direction of the tire, and each conductive rubber member is formed such that a continuous lower portion thereof are electrically connected along the circumferential direction of the tire at a tire radial direction inner side region of the tread portion, wherein the tread portion has at least a two layer structure comprising the surface rubber layer which is disposed in an outer portion of the tread portion in the radial direction of said tire and an inner rubber layer which is disposed in an inner portion of the tread portion in the radial direction of said tire and has a specific resistance of $10^6 \Omega \cdot cm$ or less after curing by vulcanization, such that the inner rubber layer has a relatively large specific resistance in the range of $10^6$ $\Omega \cdot cm$ or less after curing by vulcanization, the conductive rubber members have better conductivity than the inner rubber layer, and each conductive rubber member extends through the surface rubber layer and the inner rubber layer with substantially the same thickness as the total thickness of the surface rubber layer and the inner rubber layer.

16. In a method of manufacturing a vulcanized tire having a tread portion and a layer radially beneath the tread portion wherein the tread includes a surface rubber layer, the improvement comprising: forming cavities in the tread portion such that the cavities are provided discontinuously along the tire circumferential direction, wherein each cavity extends from a tire radial direction outer side surface of the tread portion to a tire radial direction inner surface of the tread portion; pouring and filling, into the cavities, a rubber cement; and vulcanizing the tread portion such that the rubber cement forms a plurality of conductive rubber members which are electrically connected to the layer beneath the tread portion, wherein the vulcanized surface rubber layer has a specific resistance of $10^8 \Omega \cdot cm$ or more and the vulcanized conductive rubber members have a specific resistance of $10^6 \Omega \cdot cm$ or less wherein the tread portion has at least a two layer structure comprising the surface rubber layer which is disposed in an outer portion of the tread portion in the radial direction of said tire and an inner rubber layer which is disposed in an inner portion of the tread portion in the radial direction of said tire and has a specific resistance of $10^6 \Omega \cdot cm$ or less after curing by vulcanization, such that the inner rubber layer has a relatively large specific resistance in the range of $10^6 \Omega \cdot cm$ or less after curing by vulcanization, the conductive rubber members have better conductivity than the inner rubber layer, and each conductive rubber member extends through the surface rubber layer and the inner rubber layer with substantially the same thickness as the total thickness of the surface rubber layer and the inner rubber layer.

17. The method of manufacturing a pneumatic tire according to claim 16, wherein the rubber cement is poured into the cavities, together with water or an organic solvent.

* * * * *